US009521689B2

United States Patent
He

(10) Patent No.: US 9,521,689 B2
(45) Date of Patent: Dec. 13, 2016

(54) METHOD AND APPARATUS FOR CONTROLLING SERVING GRANT OF USER TERMINAL OF NEIGHBORING CELL

(71) Applicant: Huawei Technologies Co., Ltd., Shenzhen (CN)

(72) Inventor: Chuanfeng He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/997,833

(22) Filed: Jan. 18, 2016

(65) Prior Publication Data

US 2016/0143054 A1    May 19, 2016

Related U.S. Application Data

(63) Continuation of application No. 14/300,767, filed on Jun. 10, 2014, now Pat. No. 9,271,305, which is a
(Continued)

(30) Foreign Application Priority Data

Dec. 30, 2011   (CN) .......................... 2011 1 0456345
Mar. 27, 2012  (CN) .......................... 2012 1 0083592

(51) Int. Cl.
*H04B 7/216*      (2006.01)
*H04W 72/14*    (2009.01)
(Continued)

(52) U.S. Cl.
CPC ......... *H04W 72/14* (2013.01); *H04W 72/0466* (2013.01); *H04W 76/046* (2013.01)

(58) Field of Classification Search
None
See application file for complete search history.

(56) References Cited

U.S. PATENT DOCUMENTS 7,613,157 B2    11/2009  Pan et al.
8,625,499 B2 *   1/2014  Tseng ................ H04W 72/1289
                                                                  370/230
(Continued)

FOREIGN PATENT DOCUMENTS

CN           1905730 A      1/2007
CN         101483869 A      7/2009
(Continued)

OTHER PUBLICATIONS

"Common E-RGCH for interference control in CELL FACH," 3GPP TSG RAN WG1 Meeting #67, San Francisco, USA, R1-113850, 3rd Generation Partnership Project, Valbonne, France (Nov. 14-18, 2011).
(Continued)

*Primary Examiner* — Duc C Ho
(74) *Attorney, Agent, or Firm* — Leydig, Voit & Mayer, Ltd.

(57) ABSTRACT

Embodiments of the disclosure provide a method, an apparatus, and a system for controlling a serving grant of a user terminal (UE) of a neighboring cell. The method is used for controlling a UE in a CELL-FACH state or in an idle state of a neighboring cell through a common E-RGCH. The method includes: obtaining a control command by monitoring the common E-RGCH of the neighboring cell; determining whether the UE satisfies at least one further configured controlled condition; and when the UE satisfies the at least one controlled condition, adjusting the serving grant of the UE based on the obtained control command. Through the method and the apparatus according to the embodiments of the disclosure, throughput of the UE may be prevented from being reduced excessively, thereby improving communication performance.

12 Claims, 1 Drawing Sheet

Related U.S. Application Data continuation of application No. PCT/CN2012/086903, filed on Dec. 19, 2012.

(51) Int. Cl.
*H04W 76/04* (2009.01)
*H04W 72/04* (2009.01)

(56) References Cited

U.S. PATENT DOCUMENTS

| | | | |
|---|---|---|---|
| 8,730,922 B2* | 5/2014 | Hultell | H04B 7/0404 370/329 |
| 2006/0215602 A1 | 9/2006 | Usuda et al. | |
| 2007/0066335 A1 | 3/2007 | Lee | |
| 2008/0070583 A1 | 3/2008 | Tseng et al. | |
| 2008/0225764 A1 | 9/2008 | Tseng | |
| 2009/0109912 A1 | 4/2009 | DiGirolamo et al. | |
| 2010/0265964 A1 | 10/2010 | Lindskog et al. | |
| 2012/0028644 A1 | 2/2012 | Li | |
| 2012/0213092 A1* | 8/2012 | Sun | H04W 52/244 370/248 |
| 2012/0220324 A1 | 8/2012 | Sambhwani et al. | |
| 2013/0083756 A1 | 4/2013 | Pradas et al. | |

FOREIGN PATENT DOCUMENTS

| | | |
|---|---|---|
| CN | 101572904 A | 11/2009 |
| CN | 101919190 A | 12/2010 |
| JP | 2008530837 A | 8/2008 |
| JP | 2014528191 A | 10/2014 |
| WO | WO 2006081874 A1 | 8/2006 |
| WO | WO 2010128201 A1 | 11/2010 |
| WO | WO 2013023735 A1 | 2/2013 |

OTHER PUBLICATIONS

"Common E-RGCH based Interference Control for CELL FACH," 3GPP TSG RAN WG1 Meeting #67, San Francisco, USA, R1-114013, 3rd Generation Partnership Project, Valbonne, France (Nov. 14-18, 2011).

"On Common E-RGCH for Interference Management in CELL_FACH," 3GPP TSG RAN WG1 Meeting #67, San Francisco, USA, R1-114037, 3rd Generation Partnership Project, Valbonne, France (Nov. 14-18, 2011).

"Signalling based interference control and time reduction of uplink initial access in CELL_FACH," 3GPP TSG RAN WG1 Meeting #66bis, Zhuhai, China, R1-112982, 3rd Generation Partnership Project, Valbonne, France (Oct. 10-14, 2011).

"3rd Generation Partnership Project; Technical Specification Group Radio Access Network; Medium Access Control (MAC) protocol specification (Release 11)," 3GPP TS 25.321, V11.0.0, pp. 1-198, 3rd Generation Partnership Project, Valbonne, France (Dec. 2011).

"On the benefits of signaling based interference control in CELL_FACH," 3GPP TSG RAN WG2 Meeting #73bis, Shanghai, China, R2-112134, 3rd Generation Partnership Project, Valbonne, France (Apr. 11-15, 2011).

* cited by examiner

METHOD AND APPARATUS FOR CONTROLLING SERVING GRANT OF USER TERMINAL OF NEIGHBORING CELL

CROSS-REFERENCE TO RELATED APPLICATION

This application is a continuation of U.S. patent application Ser. No. 14/300,767, filed Jun. 10, 2014, which is a continuation of International Patent Application No. PCT/CN2012/086903, filed Dec. 19, 2012, which claims priority to Chinese Patent Application No. 201210083592.9, filed Mar. 27, 2012. The International application claims priority to Chinese Patent Application No. 201110456345.4, filed Dec. 30, 2011. The afore-mentioned patent applications are hereby incorporated by reference in their entireties.

TECHNICAL FIELD

Embodiments of the disclosure relate to the field of communications, and in particular, to a method, an apparatus, and a system for controlling a serving grant of a user terminal of a neighboring cell.

BACKGROUND

A CELL-FACH (cell-forward access channel) enhanced uplink feature is introduced to the WCDMA (wideband code division multiple access) R8 version of 3GPP (3rd generation partnership project), that is, a UE (user equipment) in a CELL-FACH state and in an idle (idle) state is allowed to be able to obtain an E-DCH (enhanced dedicated channel) resource through enhanced random access to replace an RACH (random access channel) in the R99 version to implement uplink transmission, so as to reduce a time delay of uplink transmission of the UE and improve an uplink transmission rate of the UE.

A soft handover technology may make the UE establish radio links with multiple cells at the same time, and a set of these radio links is referred to as a radio link set. Uplink data sent by the UE is received and combined by multiple cells in the radio link set, thereby ensuring uplink throughput of the UE in a handover region. At the same time, the multiple cells in the radio link set may control uplink transmit power and a serving grant of the UE, so as to achieve an objective of controlling neighboring cell interference.

The soft handover technology is not supported in the CELL-FACH state or in the idle state, so the control of the neighboring cell interference caused by the uplink transmission of the UE in the CELL-FACH state or in the idle state is a problem required to be studied. In the CELL-FACH enhanced uplink feature of the R8 version, no neighboring cell interference control mechanism is introduced, while in the R11 version, the CELL-FACH state continues to be enhanced, where the introduction of interference control is included. Therefore, a method and an apparatus for controlling the neighboring cell interference in the uplink transmission of the UE in the CELL-FACH state or in the idle state are required.

SUMMARY

The embodiments of the disclosure target the above objective, and the objective of the present application is to provide a method and an apparatus for controlling a serving grant of a user terminal of a neighboring cell, which can control neighboring cell interference in uplink transmission of a UE in a CELL-FACH state or in an idle state.

In one aspect, a method for controlling a serving grant of a user terminal of a neighboring cell is provided, which is used for controlling a UE in a CELL-FACH state or in an idle state of each neighboring cell through a common E-RGCH channel of each cell, where the UE in the CELL-FACH state or in the idle state obtains a control command by monitoring the common E-RGCH channel of a neighboring cell of a cell to which the UE belongs, thereby adjusting a serving grant of the UE, and the method includes: further setting at least one controlled condition; determining whether the UE satisfies the at least one controlled condition; and when the UE satisfies the at least one controlled condition, adjusting the serving grant of the UE based on the obtained control command.

In another aspect, an apparatus for controlling a serving grant of a user terminal of a neighboring cell is provided, which is used for controlling a UE in a CELL-FACH state or in an idle state of each neighboring cell through a common E-RGCH channel of each cell, where the UE in the CELL-FACH state or in the idle state obtains a control command by monitoring the common E-RGCH channel of a neighboring cell of a cell to which the UE belongs, thereby adjusting a serving grant of the UE, and the apparatus includes: a setting unit, configured to further set at least one controlled condition; a determination unit, configured to determine whether the UE satisfies the at least one controlled condition; and a control unit, configured to, when the UE satisfies the at least one controlled condition, adjust the serving grant of the UE based on the obtained control command.

Through the method and the apparatus for controlling a serving grant of a user terminal of a neighboring cell according to the embodiments of the present application, interference control may be performed on a UE in a CELL-FACH state or in an idle state of a neighboring cell, and at the same time, throughput of the UE may be prevented from being reduced excessively, thereby improving communication performance.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
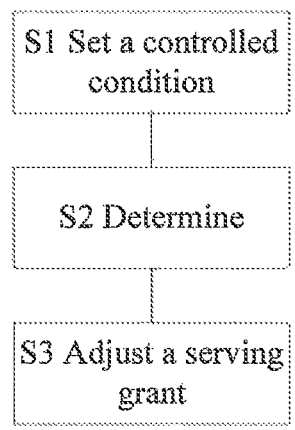
FIG. 1 is a schematic flow chart showing a method for controlling a serving grant of a user terminal of a neighboring cell according to an embodiment of the disclosure.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

In order to control interference of a UE in a CELL-FACH state or in an idle state of a neighboring cell in uplink transmission, a common E-RGCH (enhanced dedicated channel relative grant channel) channel may be configured in each cell, which is used for monitoring when the UE in the CELL-FACH state or in the idle state of the neighboring cell satisfies a certain condition. If each cell finds that neighboring cell interference is high, a "down" (down) command may be sent through the configured common E-RGCH channel to control the UE in the CELL-FACH state or in the idle state of the neighboring cell to lower a serving grant (SG), thereby reducing neighboring cell interference generated by the UE.

The condition for a UE to monitor a common E-RGCH channel of a neighboring cell may include: the UE detects that a path loss difference between a current cell and the neighboring cell is less than a certain threshold; and the UE detects that a measurement result of a CPICH (common pilot channel) channel of the neighboring cell reaches a threshold for reporting a measurement event (Event).

In a specific control process, an RNC (radio network controller) first broadcasts a primary scrambling code of each neighboring cell and a channelization code of a common E-RGCH channel, so that the UE can monitor the common E-RGCH channel, and the common E-RGCH channel is used for sending a control command to the UE of the neighboring cell. After that, when a certain cell finds that neighboring cell interference exceeds a threshold, a control command is sent on the common E-RGCH channel, for example, a "down" command, and when the UE satisfies a condition for monitoring a common E-RGCH channel of a neighboring cell, the UE monitors the common E-RGCH channel of the neighboring cell to obtain the "down" command to lower a serving grant of the UE.

At that time, in the above method for controlling neighboring cell interference, when a certain cell needs to control the UE in the CELL-FACH state or in the idle state of the neighboring cell through the common E-RGCH channel to lower the SG, so as to reduce interference, all UEs that are in multiple neighboring cells and satisfy the condition for monitoring the common E-RGCH of the cell will lower SGs according to the "down" command of the common E-RGCH, thereby making the throughput of the UE in the CELL-FACH state or in the idle state of the neighboring cell fall significantly. However, in practice, the objective of controlling interference may be achieved only by lowering SGs of part of the UEs.

In another aspect, a certain UE in the CELL-FACH state or in the idle state may satisfy a condition for monitoring common E-RGCH channels of multiple neighboring cells, and when any neighboring cell needs to control interference through a common E-RGCH, the UE in the CELL-FACH state or in the idle state is controlled to lower a SG of the UE, thereby causing excessive reduction of the throughput of the UE.

Based on the above problem, an embodiment of the disclosure provides a method for controlling a serving grant of a user terminal of a neighboring cell, which is used for controlling a UE in a CELL-FACH state or in an idle state of each neighboring cell through a common E-RGCH channel of each cell, where the UE in the CELL-FACH state or in the idle state obtains a control command by monitoring the common E-RGCH channel of a neighboring cell of a cell to which the UE belongs, thereby adjusting a serving grant of the UE, and the method includes: further setting at least one controlled condition; determining whether the UE satisfies the at least one controlled condition; and when the UE satisfies the at least one controlled condition, adjusting the serving grant of the UE based on the obtained control command.

That is to say, in the embodiment of the disclosure, in addition to the monitoring condition for the UE to monitor the common E-RGCH channel of the neighboring cell, one or more controlled conditions are set additionally, and only in a situation that it is determined that the UE satisfies the one or more controlled conditions, the UE adjusts a working state of the UE itself based on the obtained control command, for example, lowering a serving grant, thereby reducing interference that the UE in the CELL-FACH state or in the idle state causes to the neighboring cell in an uplink transmission process. In this way, through the additionally set at least one controlled condition, control granularity for the UE in the CELL-FACH state or in the idle state may further be increased, so as to avoid a rough change of serving grants of all UEs in the CELL-FACH state or in the idle state that satisfy the monitoring condition, thereby preventing a situation of excessive reduction of overall throughput of all UEs in a neighboring cell of a cell that needs to control neighboring cell interference, and excessive reduction of individual throughput of a single UE.

FIG. 1 is a schematic flow chart showing a method for controlling a serving grant of a user terminal of a neighboring cell according to an embodiment of the disclosure. As shown in FIG. 1, the method is used for controlling a UE in a CELL-FACH state or in an idle state of a neighboring cell through a common E-RGCH channel, where the UE in the CELL-FACH state or in the idle state obtains a control command by monitoring the common E-RGCH channel of the neighboring cell, thereby adjusting a serving grant of the UE, and the method includes: S1: further setting at least one controlled condition; S2: determining whether the UE satisfies the at least one controlled condition; and S3: when the UE satisfies the at least one controlled condition, adjusting the serving grant of the UE based on the obtained control command.

The above method further includes: when the UE does not satisfy one or more controlled conditions among the at least one controlled condition, controlling the UE not to monitor a corresponding control command on the common E-RGCH channel.

The above method further includes: when the UE does not satisfy one or more controlled conditions among the at least one controlled condition, controlling the UE to neglect the obtained corresponding control command.

As mentioned above, generally, when the UE satisfies a condition for monitoring a common E-RGCH channel of a cell to which the UE belongs, a control command may be obtained from the common E-RGCH channel to adjust the serving grant of the UE. However, a situation that the UE does not satisfy the condition for monitoring a common E-RGCH channel of a cell to which the UE belongs may also emerge. In the embodiment of the disclosure, in addition to the condition for monitoring the common E-RGCH channel, one or more controlled conditions are further set additionally, so it may be determined whether the UE satisfies all conditions including the condition for monitoring the common E-RGCH channel, and only when the UE satisfies the condition for monitoring the common E-RGCH channel and all the set controlled conditions, a working state of the UE is adjusted based on the obtained control command, for example, lowering the serving grant, thereby improving control granularity of the UE. When the UE has not yet satisfied all the conditions including the condition for monitoring the common E-RGCH channel, there may also be two options: first, the UE may not monitor the common E-RGCH channel at all, so the UE cannot obtain the control command; or the UE may be enabled to keep monitoring the common E-RGCH channel to obtain the control command, and only whether the control command is neglected is controlled at the end of the UE. In a specific situation, adjustment may be performed according to specific configuration of the UE end, and the embodiment of the disclosure is not intended to impose any limitation on this.

In the above method, for example, the working state of the UE may be adjusted by lowering the serving grant of the UE. In the above descriptions, it has already been mentioned that the objective of controlling neighboring cell interference may be achieved by controlling uplink transmit power and the serving grant of the UE. In a current environment, lowering the serving grant will also reduce the uplink transmit power to certain extent, so in the embodiment of the disclosure, the objective of reducing interference in uplink transmission is achieved preferably by lowering the SG. Definitely, persons skilled in the art can understand that, here, the interference in the uplink transmission may also be reduced in another manner of adjusting the working state of the UE, for example, directly reducing the uplink transmit power, thereby implementing control on the neighboring cell interference, and the embodiment of the disclosure is not intended to impose any limitation on this.

In the above method, the at least one controlled condition is a serving grant threshold of the UE; and the step of determining whether the UE satisfies the at least one controlled condition specifically is: determining whether the serving grant of the UE is higher than the serving grant threshold, and when the serving grant of the UE is higher than the serving grant threshold, determining that the UE satisfies the at least one controlled condition.

In the embodiment of the disclosure, the at least one controlled condition may be a threshold of the SG, referred to as an SG threshold below. In this way, when the UE in the CELL-FACH state or in the idle state monitors the common E-RGCH channel of the neighboring cell, the UE may compare the SG of the UE with a set SG threshold, and when the SG of the UE is lower than the set SG threshold, the UE is no longer controlled by the common E-RGCH channel of the neighboring cell, for example, not monitoring the common E-RGCH channel, or neglecting the control command of the common E-RGCH channel. Only when the SG of the UE is higher than the set SG threshold, and at the same time, the UE satisfies the condition for monitoring the common E-RGCH channel of the neighboring cell, the UE adjusts the working state of the UE according to the control command obtained by monitoring the common E-RGCH channel of the neighboring cell, for example, lowering the SG, thereby reducing the interference in the uplink transmission.

Here, the SG of the UE itself decides throughput of the UE, so setting the SG threshold of the UE itself may make each terminal UE maintain a certain SG, and not make the SG be lowered excessively. That is to say, after the above method is adopted, after the SG of the UE in the CELL-FACH state or in the idle state is lowered to a certain extent, the UE no longer follows the control command sent by the common E-RGCH channel, to further reduce the SG, thereby avoiding excessive reduction of the throughput of the UE in the CELL-FACH state or in the idle state. Also, by directly setting a controlled threshold to an SG of each UE, the above effect may be achieved through direct control on the SG, which improves precision of the control.

In the above method, the at least one controlled condition is multiple monitoring thresholds for monitoring the common E-RGCH channel, where the multiple monitoring thresholds include a first monitoring threshold, and the first monitoring threshold is a monitoring threshold for the determining whether the UE in the CELL-FACH state or in the idle state can monitor the common E-RGCH channel; and the step of determining whether the UE satisfies the at least one controlled condition specifically is: determining which range interval among multiple range intervals limited by the multiple monitoring thresholds a measurement result of the UE is in, and when the measurement result of the UE is in a specified range interval among the multiple range intervals limited by the multiple monitoring thresholds, determining that the UE satisfies the at least one controlled condition.

The above method further includes: making the multiple range intervals limited by the multiple monitoring thresholds correspond one-to-one to multiple control commands on the common E-RGCH channel, and the step of adjusting a serving grant of the UE based on the obtained control command specifically is: adjusting the serving grant of the UE based on a control command corresponding to the specified range interval.

In the above method, the step of making the multiple range intervals limited by the multiple monitoring thresholds correspond one-to-one to the multiple control commands on the common E-RGCH channel specifically includes: making the multiple range intervals limited by the multiple monitoring thresholds correspond one-to-one to multiple different signatures configured on the common E-RGCH channel; and sending multiple control commands through the multiple different signatures configured on the common E-RGCH channel, where in a situation that the measurement result of the UE is in one of the multiple range intervals limited by the multiple monitoring thresholds, the UE monitors a signature that is configured on the common E-RGCH channel and corresponds to this specified range interval.

In the above method, the measurement result of the UE is used for the UE to decide whether to monitor the common E-RGCH channel of the neighboring cell, and includes measurement values such as a path loss difference, a measurement event, and EcIo.

Specifically, in a current situation, the condition for the UE to monitor the common E-RGCH channel is already set, namely, the aforementioned condition that the UE detects that a path loss difference between a current cell and the neighboring cell is less than a certain threshold; and the UE detects that a measurement result of a CPICH channel of the neighboring cell reaches a threshold for reporting a measurement event. In the embodiment of the disclosure, the condition is referred to as the first monitoring threshold. In addition, in the method for controlling neighboring cell interference in the embodiment of the disclosure, one or more new monitoring thresholds may be further set additionally, that is, thresholds for deciding the monitoring of the common E-RGCH channel of the neighboring cell, such as a path loss difference, a measurement event, and EcIo. In this way, in addition to that the first monitoring threshold classifies the UE into two types of UEs: a UE capable of monitoring the common E-RGCH channel and a UE incapable of monitoring the common E-RGCH channel, the UE capable of monitoring the common E-RGCH channel is further classified through a new monitoring threshold. Taking the above description as an example, it is assumed that a path loss difference of the UE capable of monitoring the common E-RGCH channel needs to satisfy a condition of being less than a, other two thresholds b and c of the path loss difference are set, and c<b<a. The three thresholds a, b and c limit multiple range intervals, that is, being greater than b and less than a, being greater than c and less than b, and being less than c, so the UE satisfying the monitoring of the common E-RGCH channel can further be classified into three types, that is, having a path loss difference being greater than b and less than a, having a path loss difference being greater than c and less than b, and having a path loss difference being less than c. That is, measurement results of the UE are in the range intervals of being greater than b and less than a, being greater than c and less than b, and being less than c. In this way, only the working state of the UE in a certain specified range, for example, in a range of being greater than b and less than a may be controlled and adjusted, for example, lowering the SG, thereby reducing the neighboring cell interference. Definitely, here persons skilled in the art may also understand that, the embodiment of the disclosure may also lower SGs of the UE in several specified ranges, for example, lowering a SG of the UE in the range of being greater than c and less than b and a SG of the UE in the range of being less than c at the same time.

In addition, corresponding to further classification of the UE satisfying the monitoring of the common E-RGCH channel, classification for control commands of the common E-RGCH channel may also be further set, namely, the control commands of the common E-RGCH channel may be made to correspond to different ranges of the UE that are limited by multiple monitoring thresholds. Likewise, as the above example, UEs whose measurement results are in the ranges of being greater than b and less than a, being greater than c and less than b, and being less than c may obtain control commands corresponding to the several ranges from the common E-RGCH channel. For example, corresponding to a monitoring threshold in the range being greater than b and less than a, the SG may not be lowered; corresponding to a monitoring threshold in the range greater than c and less than b, the SG may be lowered by one level; and corresponding to the monitoring threshold in the range being less than c, the SG may be lowered by two levels. In this way, by issuing different control commands for a UE in different monitoring conditions to control a working state of the UE, precision of the control may obviously be further improved, thereby improving overall efficiency of a communication system.

Specifically, correspondence between different control commands and different monitoring conditions of the UE may be implemented at the end of the UE, or implemented at the end of the common E-RGCH channel. For example, when the common E-RGCH channel issues a control command, multiple control commands may be sent at the same time, and at the same time, each control command carries an identifier of a corresponding monitoring condition. In this way, after receiving the multiple control commands, the UE may perform matching based on an identifier of a monitoring condition and the monitoring condition of the UE, so as to selectively respond to one of the control commands. In addition, it may also be implemented at the end of the UE, which is making different monitoring conditions, that is, ranges of monitoring thresholds correspond one-to-one to the multiple different signatures configured on the common E-RGCH channel, and the common E-RGCH channel sends the multiple control commands through the configured multiple different signatures. In this way, when monitoring the common E-RGCH channel, the UE may select a signature corresponding to a current specified monitoring condition according to a specified range that is limited by the multiple monitoring thresholds and where a measurement result is located, thereby obtaining a control command corresponding to the signature.

Here, the multiple control commands are set according to a situation of the neighboring cell interference. For example, the nearer to a cell center a certain UE is, the larger a path loss difference of the UE is, and as the UE moves towards a cell edge, the path loss difference of the UE gradually decreases. However, as the UE moves towards the cell edge, interference that the UE causes to the neighboring cell is enhanced correspondingly. Therefore, in the embodiment of the disclosure, it may be set that the closer to the cell edge the UE is, the more the SG is lowered, namely, as the aforementioned situation, in a situation of a smaller path loss difference, the SG of the UE is lowered more. In this way, by controlling a SG of a UE satisfying a threshold range of a corresponding monitoring condition, control on the SG of the UE may be optimized, thereby achieving the objective of optimally controlling the interference of the UE in the uplink transmission.

When the UE decides, according to whether the measurement result reaches a condition for triggering event 1A, whether to monitor the common E-RGCH channel of the neighboring cell, the multiple monitoring thresholds may be set according to the triggering condition of the measurement event 1A. A current condition for triggering event 1A is decided by the following formulas.

When a measurement item is the path loss difference, the triggering condition is:

$$10 \cdot \mathrm{Log} M_{New} + CIO_{New} \leq$$
$$W \cdot 10 \cdot \mathrm{Log}\left(1 \Big/ \sum_{i=1}^{N_A}(1/M_i)\right) + (1-W) \cdot 10 \cdot \mathrm{Log} M_{Best} + (R_{1a} - H_{1a}/2)$$

when the measurement item is a measurement item other than the path loss difference, the triggering condition is:

$$10 \cdot \mathrm{Log} M_{New} + CIO_{New} \geq$$
$$W \cdot 10 \cdot \mathrm{Log}\left(\sum_{i=1}^{N_A} M_i\right) + (1-W) \cdot 10 \cdot \mathrm{Log} M_{Best} - (R_{1a} - H_{1a}/2)$$

where, $M_{New}$ is a measurement result of a cell entering a measurement reporting range;

$CIO_{New}$ is an offset of the cell entering the measurement reporting range;

$M_i$ is a measurement result of a cell not limited to participate in calculation of a reporting range in an active set;

$N_A$ is the number of cells not limited to participate in the calculation of the reporting range in the current active set;

W is a parameter that a network side sends to a user equipment;

$R_{1a}$ is a reporting range constant; and $H_{1a}$ is a hysteresis parameter of event 1A.

For the situation that the measurement item is the path loss difference:

$M_{Best}$ is a measurement result of a cell with the lowest measurement result among the cells not limited to participate in the calculation of the reporting range in the active set, without considering an offset of any cell.

For the situation that the measurement item is the measurement item other than the path loss difference:

$M_{Best}$ is a measurement result of a cell with the highest measurement result among the cells not limited to participate in the calculation of the reporting range in the active set, without considering the offset of any cell; and it can be known from the above formulas for calculating the triggering of the measurement event that, the triggering condition is decided collectively by the measurement result of the cell not limited to participate in the calculation of the reporting range in the active set $M_i$, $M_{Best}$, and the measurement result of the cell entering the measurement reporting range $M_{New}$, and the configured parameters $CIO_{New}$, W, $R_{1a}$, and $H_{1a}$. At present, the parameters $CIO_{New}$, W, $R_{1a}$, and $H_{1a}$ are configured into a certain value by a network side, and according to the above formulas, the UE may obtain a unique threshold for triggering event 1A according to the measurement result, thereby deciding whether to monitor the common E-RGCH channel of the neighboring cell. By configuring multiple corresponding parameters of multiple different values for one or more parameters among the parameters $CIO_{New}$, W, $R_{1a}$ and $H_{1a}$, multiple thresholds for triggering event 1A may be obtained according to the above formula, that is, multiple monitoring thresholds for monitoring the common E-RGCH channel of the neighboring cell. For example, multiple different $CIO_{New}$ parameters may be configured for the parameter $CIO_{New}$, such as $CIO_{New1}$, $CIO_{New2}$, and $CIO_{New3}$, and each different $CIO_{New}$ parameter decides a different threshold for triggering the event 1A, namely, multiple monitoring thresholds for deciding to monitor the common E-RGCH channel of the neighboring cell.

When the UE decides, according to whether the measurement result reaches a defined threshold T, whether to monitor the common E-RGCH channel of the neighboring cell, multiple monitoring thresholds may be implemented by defining multiple thresholds T. The defined threshold T may be the path loss difference, CPICH Ec/N0 (common pilot channel received chip energy divided by band power spectral density), or CPICH RSCP (CPICH Received Signal Code Power, common pilot channel received signal code power). For example, multiple thresholds T are defined, such as T1, T2 and T3, and each different threshold T decides different monitoring thresholds for deciding to monitor the common E-RGCH channel of the neighboring cell.

As described above, in a situation that only one monitoring threshold is configured, and when it is found that the neighboring cell interference exceeds a limit, a "down" command is sent through the common E-RGCH channel. At this time, in the neighboring cell, SGs of all UEs in the CELL-FACH state or in the idle state that satisfy the monitoring the common E-RGCH channel is lowered. However, in practice, the objective of controlling interference can be achieved by reducing interference of only part of the UEs in the CELL-FACH state or in the idle state. By configuring multiple thresholds for monitoring the common E-RGCH channel, UEs that may cause interference for the neighboring cell may be classified, and through the different control commands configured on the common E-RGCH channel, the interference of part of the UEs in the CELL-FACH state or in the idle state is controlled. Persons skilled in the art can understand that, as long as the objective of controlling the neighboring cell interference can be achieved, the embodiment of the disclosure is not intended to make unnecessary limitation on a specific control process. In this way, by avoiding reduction of the SGs of all the UEs, excessive reduction of the throughput of the UE in the CELL-FACH state or in the idle state may be avoided.

In addition, conditions of the SG threshold and the monitoring threshold may also be combined for use, namely, in the above method, the at least one controlled condition may be the serving grant threshold of the UE and multiple monitoring thresholds for monitoring the common E-RGCH channel. Also, the step of determining whether the UE satisfies the at least one controlled condition specifically is: determining whether the serving grant of the UE is higher than the serving grant threshold and which range among the multiple ranges limited by the multiple monitoring thresholds the measurement result of the UE is in, where when the serving grant of the UE is higher than the serving grant threshold and the measurement result of the UE is in a specified range limited by the multiple monitoring thresholds, the UE satisfies the at least one controlled condition.

That is, in the example of combining the above SG threshold and the multiple monitoring thresholds, in a situation of configuring multiple thresholds for deciding to monitor the common E-RGCH channel of the neighboring cell, such as the path loss difference and the measurement result, the SG threshold is further configured. Here, the SG threshold may be a common SG threshold in all monitoring conditions, or a respective SG threshold in each monitoring condition. When the UE compares the measured path loss difference, measurement result and so on with the configured monitoring thresholds, in a situation of satisfying a range of a certain monitoring threshold, the UE monitors the common E-RGCH channel of the neighboring cell to obtain a corresponding control command. At the same time, when the SG of the UE is lower than a SG threshold or a common SG threshold corresponding to the monitoring threshold, in the situation of satisfying the monitoring threshold such as the path loss difference and the measurement result, the UE adjusts the working state of the UE according to the control command obtained by monitoring the common E-RGCH channel of the neighboring cell, for example, lowering the SG.

Similarly, the descriptions in the above example of separately applying the SG threshold and the monitoring threshold may also be equivalently applied to an example of combining the both. Also, persons skilled in the art can understand that, as long as the objective of controlling the neighboring cell interference can be achieved, the embodiment of the disclosure is not intended to make unnecessary limitation on a specific control process. Also, by combining the SG threshold and the monitoring threshold, not only graded control on the UE in the CELL-FACH state or in the idle state can be satisfied, but also excessive reduction of the SG of the UE in the CELL-FACH state or in the idle state is avoided.

In another aspect of the embodiment of the disclosure, an apparatus for controlling a serving grant of a user terminal of a neighboring cell is provided, which is used for controlling a UE in a CELL-FACH state or in an idle state of each neighboring cell through a common E-RGCH channel of each cell, where the UE in the CELL-FACH state or in the idle state obtains a control command by monitoring the common E-RGCH channel of a neighboring cell of a cell to which the UE belongs, thereby adjusting a serving grant of the UE, and the apparatus includes: a setting unit, configured to further set at least one controlled condition; a determination unit, configured to determine whether the UE satisfies the at least one controlled condition; and a control unit, configured to, when the UE satisfies the at least one controlled condition, adjust the serving grant of the UE based on the obtained control command.

Through the above apparatus for controlling a serving grant of a user terminal of a neighboring cell, in addition to a monitoring condition for the UE to monitor the common E-RGCH channel of the neighboring cell, one or more controlled conditions may be set additionally, and only in a situation that it is determined that the UE satisfies the one or more controlled conditions, the UE adjusts a working state of the UE based on the obtained control command, thereby reducing interference that the UE in the CELL-FACH state or in the idle state causes to the neighboring cell in an uplink transmission process. In this way, through the additionally set at least one controlled condition, control granularity for the UE in the CELL-FACH state or in the idle state may further be increased, so as to avoid a rough change of working states of all UEs in the CELL-FACH state or in the idle state that satisfy the monitoring condition, thereby preventing a situation of excessive reduction of overall throughput of all UEs in a neighboring cell of a cell that needs to control neighboring cell interference, and excessive reduction of individual throughput of a single UE.

Figure 2:
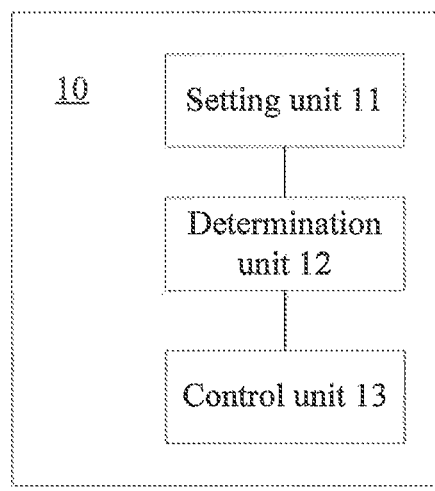
FIG. 2 is a schematic block diagram showing an apparatus for controlling a serving grant of a user terminal of a neighboring cell according to an embodiment of the present invention.
Figure 3:
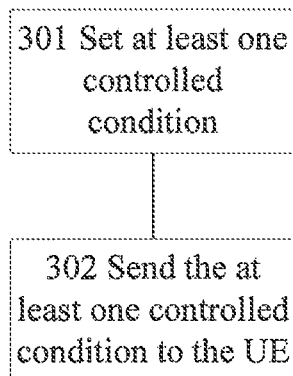
FIG. 3 is a schematic flow chart showing a method for controlling a serving grant of a user terminal of a neighboring cell according to an embodiment of the present invention.

FIG. 2 is a schematic block diagram showing an apparatus for controlling a serving grant of a user terminal of a neighboring cell according to an embodiment of the disclosure. As shown in FIG. 2, an apparatus for controlling a serving grant of a user terminal of a neighboring cell 10 is used for controlling a UE in a CELL-FACH state or in an idle state of each neighboring cell through a common E-RGCH channel of each cell, where the UE in the CELL-FACH state or in the idle state obtains a control command by monitoring the common E-RGCH channel of a neighboring cell of a cell to which the UE belongs, thereby adjusting a serving grant of the UE, and the apparatus 10 includes: a setting unit 11, configured to further set at least one controlled condition; a determination unit 12, connected to the setting unit 11, and configured to determine whether the UE satisfies the at least one controlled condition; and a control unit 13, connected to the determination unit 12, and configured to, when the UE satisfies the at least one controlled condition, adjust the serving grant of the UE based on the obtained control command.

In the above apparatus, the control unit is further configured to: when the UE does not satisfy one or more controlled conditions among the at least one controlled condition, control the UE not to monitor the common E-RGCH channel.

In the above apparatus, the control unit is further configured to: when the UE does not satisfy one or more controlled conditions among the at least one controlled condition, control the UE to neglect the obtained control command.

In the above apparatus, the control unit adjusts the working state of the UE by lowering the serving grant of the UE.

In the above apparatus for controlling neighboring cell interference, the at least one controlled condition is a serving grant threshold of the UE; the determining unit determines whether the UE satisfies the at least one controlled condition specifically is: determining whether the serving grant of the UE is higher than the serving grant threshold, where when the serving grant of the UE is higher than the serving grant threshold, the determination unit determines that the UE satisfies the at least one controlled condition.

In the above apparatus, the at least one controlled condition is multiple monitoring thresholds for monitoring the common E-RGCH channel; the determination unit determining whether the UE satisfies the at least one controlled condition specifically is: determining which range among multiple ranges limited by the multiple monitoring thresholds a measurement result of the UE is in, where determination unit when the measurement result of the UE is in a specified range limited by the multiple monitoring thresholds, the determination unit determines that the UE satisfies the at least one controlled condition.

In the above apparatus for controlling neighboring cell interference, the control unit is further configured to make the multiple ranges limited by the multiple monitoring thresholds correspond one-to-one to multiple control commands on the common E-RGCH channel, and the control unit adjusting the working state of the UE based on the obtained control command specifically is: adjusting the working state of the UE based on a control command corresponding to a specified range.

In the above apparatus for controlling neighboring cell interference, the control unit making the multiple ranges limited by the multiple monitoring thresholds correspond one-to-one to the multiple control commands on the common E-RGCH channel specifically includes: making the multiple ranges limited by the multiple monitoring thresholds correspond one-to-one to multiple different signatures configured on the common E-RGCH channel; and receiving multiple control commands through the multiple different signatures configured on the common E-RGCH channel, where in a situation that the determination unit determines that the measurement result of the UE is in the specified range limited by the multiple monitoring thresholds, the control unit controls the UE to monitor a signature that is configured on the common E-RGCH channel and corresponds to the specified range.

In the above apparatus for controlling neighboring cell interference, the at least one controlled condition is a serving grant threshold of the UE and multiple monitoring thresholds for monitoring common E-RGCH channel; and the determination unit determining whether the UE satisfies the at least one controlled condition specifically is: determining whether the serving grant of the UE is higher than the serving grant threshold and which range among multiple ranges limited by the multiple monitoring thresholds the measurement result of the UE is in, where when the serving grant of the UE is higher than the serving grant threshold and the measurement result of the UE is in a specified range limited by the multiple monitoring thresholds, the determination unit determines that the UE satisfies the at least one controlled condition.

In the above apparatus, the measurement result of the UE includes at least one of the following: a path loss difference between the cell to which the UE belongs and the neighboring cell, and that the UE detects that a measurement result of a CPICH channel of the neighboring cell reaches a threshold for reporting a measurement event.

In addition, details in the descriptions about the above method for controlling a serving grant of a user terminal of a neighboring cell may also be equivalently applied to the apparatus for controlling a serving grant of a user terminal of a neighboring cell, which is not repeated again for simplicity.

In addition, persons skilled in the art can understand that, the above apparatus for controlling a serving grant of a user terminal of a neighboring cell may be set at the end of a user equipment, or set at the end of a base station, or set at one end of an RNC, and is used for controlling the working state of each user equipment to reduce interference of the user equipment on the neighboring cell. In addition, in replace of being wholly setting in the user equipment, the above apparatus for controlling a serving grant of a user terminal of a neighboring cell may also be distributed in a communication system formed of a user equipment, a base station and an RNC. For example, the setting unit of the above apparatus for controlling neighboring cell interference is set in an RNC, so that in addition to broadcasting a primary scrambling code of each neighboring cell and a channelization code of a common E-RGCH to each UE, the RNC further broadcasts the at least one controlled condition to each UE; the determination unit is set in a UE, so that the UE determines, for example, a SG condition or a monitoring condition, based on a working state of the UE; and the control unit is set in a base station, so as to control a working state of each UE. Definitely, persons skilled in the art can understand that, the above setting unit may be set in a UE or a base station and the above determination unit may also be set in a base station or an RNC, so as to perform determination by obtaining the working state of each UE, the control unit may also be set in an RNC or a user equipment, and the embodiment of the disclosure is not intended to impose any limitation on this.

Through the method and the apparatus for controlling a serving grant of a user terminal of a neighboring cell, the user terminal, the base station, the radio network controller and the communication system according to the embodiments of the disclosure, interference control may be performed on a UE in the CELL-FACH state or in the idle state of the neighboring cell, and at the same time, throughput of the UE may be prevented from being reduced excessively, thereby improving communication performance.

Persons of ordinary skill in the art can be aware that, in combination with the examples described in the embodiments disclosed in this specification, units and algorithm steps may be implemented by electronic hardware, computer software, or a combination of the two. In order to clearly describe the interchangeability between the hardware and the software, the foregoing has generally described compositions and steps of every embodiment according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for detailed working processes of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to the actual needs to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of steps of the methods described in the embodiments of the disclosure. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the disclosure, but are not intended to limit the protection scope of the present application. Any variation or replacement readily figured out by persons skilled in the art within the technical scope disclosed in the present disclosure shall fall within the protection scope of the present application. Therefore, the protection scope of the present invention shall be subject to the protection scope of the claims.

What is claimed is:

1. A method for controlling a serving grant of a user equipment (UE) through a common enhanced dedicated channel relative grant channel (E-RGCH) of a neighboring cell of a cell to which the UE belongs, wherein the UE in a cell-forward access channel (CELL-FACH) state or in an idle state, comprising:
   setting, by a radio network controller (RNC), at least one controlled condition;
   sending, by the RNC, the at least one controlled condition to the UE, the at least one controlled condition comprises a serving grant threshold, wherein the serving grant threshold is for the UE determining whether the serving grant of the UE is higher than the serving grant threshold, and adjusting the serving grant based on a control command obtained from the common E-RGCH when the serving grant of the UE is higher than the serving grant threshold.

2. The method according to claim 1, wherein the serving grant threshold is for the UE neglecting the control command when the serving grant of the UE is lower than the serving grant threshold.

3. The method according to claim 2, wherein the adjusting the serving grant comprising: lowering the serving grant.

4. The method according to claim 1, wherein the adjusting the serving grant comprising: lowering the serving grant.

5. An apparatus for controlling a serving grant of a user equipment (UE) through a common enhanced dedicated channel relative grant channel (E-RGCH) of a neighboring cell of a cell to which the UE belongs, wherein the UE in a cell-forward access channel (CELL-FACH) state or in an idle state, comprising:
   a processor; and
   a non-transitory computer-readable storage medium coupled to the processor and storing programming instructions for execution by the processor, the programming instructions instruct the processor to:
   set at least one controlled condition;
   send the at least one controlled condition to the UE, the at least one controlled condition comprises a serving grant threshold, wherein the serving grant threshold is for the UE determining whether the serving grant of the UE is higher than the serving grant threshold, and adjusting the serving grant based on a control command obtained from the common E-RGCH when the serving grant of the UE is higher than the serving grant threshold.

6. The apparatus according to claim 5, wherein the serving grant threshold is for the UE neglecting the control command when the serving grant of the UE is lower than the serving grant threshold.

7. The apparatus according to claim 6, wherein the adjusting the serving grant comprising: lowing the serving grant.

8. The apparatus according to claim 5, wherein the adjusting the serving grant comprising: lowing the serving grant.

9. A radio network controller (RNC) for controlling a serving grant of a user equipment (UE) through a common enhanced dedicated channel relative grant channel (E-RGCH) of a neighboring cell of a cell to which the UE belongs, wherein the UE in a cell-forward access channel (CELL-FACH) state or in an idle state, comprising:
   a processor; and
   a non-transitory computer-readable storage medium coupled to the processor and storing programming instructions for execution by the processor, the programming instructions instruct the processor to:
   set at least one controlled condition;
   send the at least one controlled condition to the UE, the at least one controlled condition comprises a serving grant threshold, wherein the serving grant threshold is for the UE determining whether the serving grant of the UE is higher than the serving grant threshold, and adjusting the serving grant based on a control command obtained from the common E-RGCH when the serving grant of the UE is higher than the serving grant threshold.

10. The RNC according to claim 9, wherein the serving grant threshold is for the UE neglecting the control command when the serving grant of the UE is lower than the serving grant threshold.

11. The RNC according to claim 10, wherein the adjusting the serving grant comprising: lowing the serving grant.

12. The RNC according to claim 9, wherein the adjusting the serving grant comprising: lowing the serving grant.

* * * * *